US006381582B1

(12) United States Patent
Walker et al.

(10) Patent No.: US 6,381,582 B1
(45) Date of Patent: Apr. 30, 2002

(54) METHOD AND SYSTEM FOR PROCESSING PAYMENTS FOR REMOTELY PURCHASED GOODS

(75) Inventors: Jay S. Walker, Ridgefield; Andrew S. Van Luchene, Norwalk, both of CT (US)

(73) Assignee: Walker Digital, LLC, Stamford, CT (US)

(*) Notice: Subject to any disclaimer, the term of this patent is extended or adjusted under 35 U.S.C. 154(b) by 0 days.

(21) Appl. No.: 08/940,265

(22) Filed: Sep. 29, 1997

(51) Int. Cl.[7] .......................... G06F 17/60; G06F 17/00
(52) U.S. Cl. ....................................................... 705/26
(58) Field of Search .............................. 705/14, 16, 17, 705/20, 21, 22, 23, 24, 26, 27, 28, 38, 39; 235/375, 376, 379, 380, 381; 340/825.31, 825.33, 825.34; 379/93.12

(56) References Cited

U.S. PATENT DOCUMENTS

| 4,799,156 A | | 1/1989 | Shavit et al. ................. 705/26 |
| 4,836,546 A | | 6/1989 | DiRe et al. ................. 273/138 |
| 4,992,940 A | * | 2/1991 | Dworkin ....................... 705/26 |
| 5,310,997 A | | 5/1994 | Roach et al. ............... 235/375 |
| 5,319,542 A | | 6/1994 | King, Jr. et al. ............. 705/27 |
| 5,434,394 A | | 7/1995 | Roach et al. ............... 235/375 |
| 5,451,998 A | | 9/1995 | Hamrick ...................... 348/13 |
| 5,465,291 A | | 11/1995 | Barrus et al. ............. 379/67.1 |
| 5,534,857 A | | 7/1996 | Laing et al. ........... 340/825.34 |
| 5,537,314 A | | 7/1996 | Kanter ........................ 705/14 |
| 5,570,291 A | | 10/1996 | Dudle et al. ................. 700/95 |
| 5,639,088 A | | 6/1997 | Schneider et al. .......... 273/138 |
| 5,694,551 A | * | 12/1997 | Doyle et al. .................. 705/26 |
| 5,878,401 A | * | 3/1999 | Joseph ......................... 705/22 |
| 6,055,516 A | * | 4/2000 | Johnson et al. ............... 705/27 |
| 6,115,505 A | * | 9/2000 | Withrow ...................... 235/381 |

FOREIGN PATENT DOCUMENTS

WO   WO 01/16895   *  3/2001   ............. G07F/7/02

OTHER PUBLICATIONS

Burke, "PC Makers Wrestle wih Oversupply Analysts Say More Price Cuts on Way"; Computer Reseller News; n595; pp. 45, 49; Sep. 12, 1994; Dialog: File 15, Acc# 00918542.*

Sweeney; "Unveiling the Virtual Reseller"; Computer Reseller News; n625; pp. SS9–SS10; Jan. 30, 1995; Dialog: File 15, Acc# 00971317.*

Pereira et al.; "Compaq DirectPlus Puts Channel on Edge"; Computer Reseller News; n730; p5(2); Apr. 7, 1997; Dialog: File 275, Acc# 09444174.*

Ferguson; "Too Many Sheep Looking to Graze Near Gateway's Cash Cow"; Computer Retail Week; v6 n173; p23(1); Jun. 16, 1997; Dialog: File 275, Acc# 09559380.*

(List continued on next page.)

Primary Examiner—Eric W. Stamber
Assistant Examiner—James W. Myhre
(74) Attorney, Agent, or Firm—Dean P. Aldercci

(57) ABSTRACT

Systems and methods are provided whereby goods can be purchased from a remote seller such as a catalog marketer, and paid for at a local register, such as that of a local retailer. A point-of-sale system operable by a local seller processes, in a user-friendly manner, purchase codes identifying remote sellers to enable transactions including payments for both local and remotely purchased goods. A processor operable by a remote seller generates data for use by the local seller in receiving and processing a payment for goods purchased from the remote seller. A processor operable by a processing merchant permits the processing merchant to facilitate the remote sales and local payments, reconciling the related transactions occurring at the remote seller and the local seller. Further provided is a process for use by a customer enabling remote purchase of goods with subsequent local payment at a convenient location.

73 Claims, 19 Drawing Sheets

OTHER PUBLICATIONS

Thorson, Larry; "Shop America, Iowa Cattlemen Seeks Bright Futures in Japan", The Associated Press, Feb. 19, 1990; Section: Business News.

"Convenience Stores Start Catalog Sales", Report From Japan; Mar. 27, 1991; Section: Business.

"Kroger Begins Home Delivery and Pickup in Michigan; Shoppers Express Debuts Sep. 9.", PR Newswire; Sep. 5, 1991; Section: Financial News.

"Scanfone now available in the Memphis area; Time–saving new service offers at–home grocery shopping, bill payment, and catalog ordering", PR Newswire; Jun. 17, 1992; Section: Financial News.

Hasegawa, Mina; "Women boost mail order business; office workers take to convenience of catalogues"; The Nikkei Weekly; Jul. 11, 1992; Section: Industry; p. 10.

Onozuka, Joy; "Check it out", The Daily Yomiuri; Oct. 28, 1993; Section: p. 10.

Hayden, Betty; "Store owner's game plan is succeeding on–line", Roanoke Times & World News; Jul. 9, 1995; New River Valley Edition; Section: Current, p. NRV3.

D'Innocenzio, Anne; "Catalogs' new survival tactics; direct mail catalogs holiday season marketing strategies", Capital Cities Media Inc. WWD, Nov. 1, 1995; Section: No. 82, vol. 170; p. 12; ISSN: 0149–5380.

Ody Penelope; "Connected: When you are what the stores want to 'own' Retailing . . . ", The Daily Telegraph; Jul. 22, 1997; Section: p. 4.

"More consumers pay bills at convenience stores in Japan", Aisa Pulse, Aug. 29, 1997; Section: Nationwide Financial News.

She's Got A Ticket To Fly, The Sacramento Bee, Jul. 17, 1994 at G1.

India NCR To Launch New ATM Range, Business Line, May 9, 1997 at 11.

Neshan Dias, EDS Sees Multifunctional Future for ATM Machines, The Dominion, Mar. 3, 1997 at 7.

Cataloguers Eye Japan's Convenience Stores, Business Intelligence, Jul. 10, 1997 at 6.

Japan On–Line Shopping At Convenience Stores, International Market Insight Reports, Jun. 4, 1997.

Mark Magnier, Mail Order In Japan Trips Some US Firms, Journal of Commerce, Jan. 24, 1994 at 3A.

JAL Signs Inflight Shopping Company Skymall Inc. To Provide Catalogue Shopping Services, Aviation Daily, Jun. 24, 1996 at 494.

L.A. Mitchell, Buy in the Sky; Skymall Fixes Flight Plan; Sales Soar to $50 Million, Arizona Business Gazette, Aug. 22, 1996 at 1.

Doris Hajewski, Lands' End Hoping New Inlet Stores Prove To Be Right Fit, Milwaukee Journal Sentinel, May 28, 1997 at 1.

Jeanne Sprier, Reliable source, The Dallas Morning News, Jul. 3, 1996 at 5E.

Barbara Yost, Present Tense?; At–Home Buys Make Holidays Less Stressful, The Phoenix Gazette Nov. 26, 1994 at G1.

Mary Ellen Podmolik, Smart Mart; High–Tech Approaches to Groceries, Chicago Sun–Times, May 3, 1993 at 43.

Allyson L. Stewart–Allen, Retail Technology Worth Watching, Expert Columnist, Jun. 12, 1997.

Mickey Meece, MasterCard Prepares For Takeoff Of In–Flight Video Commerce, Banking Information Source, American Banker, Sep. 25, 1995 at 1:3.

Convenience Stores Start Catalog Sales, Report from Japan, Mar. 27, 1991.

Christina Rouvalis, Penney To Put Catalog Center At Gimbels Site, Pittsburgh Post–Gazette, May 13, 1995 at B9.

Gregory A. Patterson, Now, High Flying Spenders Can Shop Above The Clouds, Wall Street Journal, Jun. 9, 1992 at 8.

* cited by examiner

| ORDER CODE 48 | CATALOG MERCHANT CODE 50 | PRICE PAID 52 | DATE PAID 54 |
|---|---|---|---|
| 9990 | 123456 | $79.95 | 8/12/97 |
| 9993 | 123456 | $32.95 | 8/12/97 |
| 555-333-3333 | 123456 | $79.95 | 8/12/97 |
| 521789 | 123477 | $25.00 | 8/12/97 |

FIG. 2B

| PRODUCT/ MERCHANT CODE 66 | PRODUCT/ MERCHANT NAME 68 | PRICE 70 |
|---|---|---|
| 1187981190 | CATSUP | 1.45 |
| 123456 | CATALOG MERCHANT A | REQUEST ORDER CODE |
| 4217689504 | SHAMPOO | 1.27 |
| 123477 | CATALOG MERCHANT B | REQUEST ORDER CODE |
| 123489 | CATALOG MERCHANT C | REQUEST ORDER CODE |

FIG. 2C

| CATALOG MERCHANT CODE 88 | MERCHANT NAME 90 | MERCHANT ADDRESS 92 | MERCHANT PHONE NUMBER 94 |
|---|---|---|---|
| 113445 | GROCER AA | 112 ORANGE RD. SANTA FE, NM 87501 | (555) 666-6666 |
| 113446 | GROCER AB | 127 BLUE DR. PHOENIX, AZ 92063 | (666) 777-7777 |
| 123456 | CATALOG MERCHANT A | 123 RD ST. ATLANTA, GA | (111) 111-1111 |
| 123457 | BANK AA | 1008 SKY DR. ATLANTA, GA | (111) 222-2222 |

FIG. 3B

| ORDER CODE 104 | PRICE 106 | CATALOG MERCHANT CODE 108 | RETAILER MERCHANT CODE 110 | POSTING DATE 112 | FULFILLMENT DATE 114 |
|---|---|---|---|---|---|
| 555-333-3333 | $79.95 | 123456 | 113445 | 8/10/97 | 8/13/97 |
| 9990 | $79.95 | 123456 | 113445 | 8/11/97 | 8/12/97 |
| 32561 | $32.99 | 123457 | - | 8/11/97 | - |
| 521789 | $25.00 | 123477 | 113445 | 8/12/97 | NA |

FIG. 3C

| ORDER CODE 140 | CUSTOMER NAME 142 | ORDER PRICE 144 | ITEM(S) ORDERED 150 | DATE ORDERED 146 | DATE PAID 148 | LOCAL POS OPERATOR 152 | DELIVERY ADDRESS 154 |
|---|---|---|---|---|---|---|---|
| 555-333-3333 | RICHARD GREEN | $79.95 | 9991 | 8/10/97 | 8/13/97 | 113445 | SUN GREEN 4224 ROUND RD. NORWALK, CT 06850 |
| 666-666-666 | ELIOT COLDWELL | $112.90 | 9990, 9993 | 8/10/97 | 8/11/97 | 113471 | SAME AS CUSTOMER ADDRESS |
| 9990 | BECKY SUN | 79.95 | NA | 8/10/97 | - | - | SAME AS CUSTOMER ADDRESS |

FIG. 4B

| RETAILER MERCHANT CODE 166 | RETAIL STORE NAME 168 | RETAIL STORE ADDRESS 170 | RETAIL STORE TELEPHONE NUMBER 172 |
|---|---|---|---|
| 113445 | GROCER AA | 112 ORANGE RD. SANTA FE, NM 87501 | (555)666-6666 |
| 113446 | GROCER AB | 127 BLUE DR. PHEONIX, AZ 92063 | (666)777-7777 |
| 113447 | RETAILER AAA | 108 AZURE CIR. TEMPE, AZ 92064 | (667)788-8888 |

FIG. 4C

| ITEM NUMBER 174 | DESCRIPTOR 184 | SIZE 186 | COLOR 188 | PRICE 190 | QTY. IN STOCK 192 |
|---|---|---|---|---|---|
| 9990 | HUNTING VEST | S | KHAKI | $79.95 | 8 |
| 9991 | HUNTING VEST | M | KHAKI | $79.95 | 7 |
| 9992 | HUNTING VEST | S | GREEN | $79.95 | 9 |
| 9993 | DECOY DUCK | NA | NA | $32.95 | 2 |

| CUSTOMER IDENTIFIER 180 | NAME 182 | ADDRESS 184 | TELEPHONE NUMBER 186 | CREDIT CARD NUMBER 188 |
|---|---|---|---|---|
| 623115 | BILL SMITH | 111 PINK DR. SANTA FE, NM 87501 | (555)555-5555 | 1111-1111-1111-1111 |
| 623116 | JILL JONES | 222 RED ST. SANTA FE, NM 87501 | (555)111-1111 | NA |
| 623117 | PETER BROWN | 666 DIABLO CIRCLE POJAQUE, NM 87502 | (555)222-2222 | NA |

FIG. 4E

METHOD AND SYSTEM FOR PROCESSING PAYMENTS FOR REMOTELY PURCHASED GOODS

FIELD OF THE INVENTION

The present invention relates to systems and methods for processing payments for goods, and more particularly to systems and methods for the local processing of payments for remotely purchased goods.

BACKGROUND OF THE INVENTION

While direct, point-of-sale marketing represents the single largest channel of retail sales, catalog sales have in recent years experienced extraordinary growth. Recent reports indicate that 53 percent of all American adults purchased merchandise by catalog in calendar year 1996, and that catalog sales will generate $76.8 billion dollars of revenue in 1997.

Point-of-sale marketing, typically represented by conventional direct-to-customer sales in retail stores, provides buyers with many well-established benefits. Such retail sales permit customers to select goods in a hands-on manner. The customer experiences the 'instant gratification' associated with receiving the purchased goods immediately upon completion of the sale. Further, point-of-sale marketing provides customers with substantial flexibility in payment options, such options including cash, credit and debit cards, lay-away plans, and other options known to those skilled in the art.

Drawbacks to conventional point-of-sale marketing include a selection that is typically limited to available retail stock. Further, point-of-sale marketing requires a customer to travel, sometimes at inconvenient times or for inconvenient distances, to examine and select products at the retail establishment.

In contrast, catalog marketing typically provides customers with a broader range of selections while enabling a customer to shop from the convenience of their home or office. The instant gratification of store shopping is exchanged for slightly delayed but convenient delivery to a location specified by the consumer. One significant drawback of catalog shopping, however, is the lack of flexibility provided in payment options.

The majority of catalog purchases are conducted by telephone and paid for by credit card. Many consumers, however, do not feel secure in providing their credit card number to a 'stranger' over a telephone. Other consumers may not wish to assume the revolving debt often associated with credit card use, while still other consumers may not even possess a credit card.

While catalog purchases can be and often are paid for by check, this presents a somewhat distracting and unwieldy method of payment for the consumer. In addition to physically writing the check, the buyer must mail the check to the catalog order processing department, and include either an order form (if ordering through the mail) or an order number (if the order was previously placed by telephone). The buyer thus assumes not only the delay of product shipping, but the further delay associated with the mailing, and perhaps clearing, of the check. Money orders present similar difficulties to checks, with the additional inconvenience of having to purchase the money order itself.

Cash payments are typically not an option for a catalog purchase. It is known to be very unsafe to mail cash currency through public mail systems, and many catalog order processors do not even have the capability to handle cash.

Some methods of retail sales are known which attempt to merge the benefits of both catalog and point-of-sale marketing. British Airways has implemented a program whereby in-flight airline passengers can order goods from a catalog, pay for the goods while on the plane using credit cards or cash, and subsequently receive the purchased goods at the designated delivery location. The selection, however, is limited to the catalog(s) offered through the program.

Many programs are known for door-to-door sales of catalog goods, with payment being collected by the seller at the time of sale or delivery (if the goods are hand-delivered). Amway, Fuller Brush, Avon, and Mary Kay are examples of companies that employ door-to-door catalog ordering and payment programs. These programs, of course, suffer from the shared drawback of offering a very limited catalog selection. Such programs may offer one or two proprietary and topic-focused catalogs for the customer to select from. This is in contrast to the thousands of direct marketing catalogs generally available to buyers.

Some retailers have established cooperative combinations of both retail store and catalog divisions. JCPenney, one of the largest retail store and catalog marketers in the United States, employs a system wherein customers can conveniently shop interchangeably between JCPenney stores and the JCPenney catalog. That is, consumers can make a catalog purchase while at a retail store, and/or receive a catalog purchase through a retail store. These types of systems, however, suffer from the same drawbacks described above; that is the limited selection of catalogs from which the customer may order at any given retail store. Further, to the best of applicant's knowledge, catalog orders placed remotely must be paid for remotely, and do not accrue the flexible payment options available to those who travel to and shop within the store.

Warehouse type retailers are known wherein customers travel to a large retail store to browse both in-stock goods and store catalogs. Goods selected for purchase can be identified by entry into a computer order/inventory system, which checks inventory, optionally accepts a credit card payment, and directs the customer to a pick-up counter to receive the goods. Service Merchandise Co. is one example of such a retailer. Such stores, while perhaps providing a larger-than-normal selection of goods, still are limited to providing those goods maintained in stock and/or available through their individual store catalog.

U.S. Pat. No. 5,434,394 to Roach et al. (Roach) shows an automated order and delivery system wherein a point-of-sale computer system is enabled to cooperate with a warehouse computer system to facilitate the shopping, product delivery and check-out processes. In Roach, the point-of-sale system is used to develop order and delivery information at the point-of-sale, and transmit that information to the warehouse system. The warehouse system is then operated to facilitate fast product delivery and/or shipping. The purchase and delivery information is communicated to the check-out register to facilitate checkout. While facilitating in-store shopping, Roach does not enable a buyer to select from a wider selection of goods than is typical in a retail store environment.

Retail stores are known wherein customers are invited to shop from catalogs, placing their orders for catalog goods through catalogs made available at the retail location. To the best knowledge of applicant, such stores operate by collecting customer orders through local point-of-sale systems, collecting funds directly from customers, and subsequently placing orders and making payments to the catalog merchants. As will be appreciated, the selection of catalogs from which a customer may select merchandise will likely be very limited to those provided by the retailer. Further, such a system requires that a customer travel to the store to browse catalogs and select goods.

On-line systems are known wherein a shopper may connect, for example over the Internet, to an on-line catalog retailer. The customer may purchase goods, and submit payment through an electronic interchange of information, or by telephone or mail. Such systems suffer from the drawbacks of conventional catalog ordering with respect to payment options. That is, a consumer must either provide a credit card to a remote 'stranger', suffer the inconvenience of writing and mailing a check, or deal with the complex electronic payment systems described below.

Electronic payment systems are known for facilitating payments for electronic transactions. First Virtual, for example, permits buyers to establish credit card-based accounts, and to use a personal identification number to submit payment for an electronic transaction. The credit card payment is then handled in an off-line manner by First Virtual. Such systems have the drawback of being complicated to establish and use, as well as ultimately requiring the use of a credit card. Further, such payment systems are not universally accepted amongst merchants.

The use of automatic teller machines (ATMs) for paying bills and for making limited purchases of goods such as tickets is known in the art. Likewise, dedicated kiosks similar in function to ATMs are known for facilitating the sale and/or delivery of goods such as airline tickets. Giselle's Travel Bureau, for example, has implemented a system where travel reservations are made by telephone, and tickets can subsequently be claimed at a remote, dedicated machine. Similarly, a company called Docunet has established a practice wherein customers make travel bookings over the phone or Internet, for airline tickets that are subsequently picked up at ATMs.

The above-described ATM systems and dedicated kiosks provide the advantage of permitting some flexibility in location for payment and for pick-up of goods. However, to the best knowledge of applicants, they are very limited in their scope of use—that is they are limited to a relatively small selection of goods/services. They are also limited in their options for payment, typically accepting only credit account information or codes indicating a pre-payment has been made.

There thus exists a need in the art for a retail system and process which provides consumers with the vast selection of goods available through catalog marketers, combined with the flexibility of payment options proffered by retail stores. Such a system and process should desirably offer the convenience of home shopping available through the use of catalogs, and the further convenience of flexible payment options at favored retail stores.

SUMMARY OF THE INVENTION

An object of the present invention is to provide a new and improved system and method for facilitating a payment for remotely purchased goods at a local point-of-sale system.

Another object of the invention is to provide a system and method for enabling buyers to pay for a catalog purchase without necessitating the use of a credit card or a mailed payment.

In accordance with one embodiment of the present invention there is provided a method and system for processing a payment for a purchase of goods by a local seller, the method including the step of inputting a code relating to a purchase of goods into a point-of-sale system. The code is processed to determine if it identifies local goods or remote goods to be purchased from and controlled by a remote seller. If the processing step identifies remote goods, then a price is determined for the remote goods, data is generated to indicate a payment has been received for the remote goods, and data indicating that the payment has been received for the remote goods is transmitted for use by a remote seller.

In accordance with another embodiment of the invention, a method and system for a remote seller to process a payment for a sale of goods is provided, the method including the step of receiving a remote order for a purchase of goods. A code and a purchase price are generated for the order. Order data is provided for use by a point-of-sale system of a local seller in receiving a payment for the order. Payment data is received confirming the payment has been paid by the consumer at the point-of-sale system of the local seller, and, responsive to receiving the payment data, the goods are shipped. Payment is subsequently received for the order from the local seller.

In yet another embodiment of the invention, a method and system of processing a payment for a sale of goods by a processor merchant is provided, the method including the step of receiving, from a remote seller, data relating to an order for goods. Next there is received, from a local seller, data indicating a payment has been received at a point-of-sale system for the order for goods. The processor then transmits to the remote seller data indicating that the payment has been received by the local seller, whereby to initiate the delivery of the goods by the remote seller.

In another embodiment of the invention there is provided a method for a customer to submit a payment for a purchase of goods, including the step of transmitting an order for the purchase of goods to a remote merchant. The customer receives a code and a purchase price for the order from the remote merchant, and provides at least one of the code and the purchase price for use by a point-of-sale system of a local seller in processing the payment for the order. Payment is submitted to the local seller at the point-of-sale system, and the goods are received from the remote merchant.

DESCRIPTION OF THE DRAWING FIGURES

The operation of the invention, as well as objects, features, and advantages thereof, are described in further detail below with reference to the drawing Figures, in which:

FIG. 2B is a table showing sample contents of the order database from the POS system of FIG. 2;

FIG. 2C is a table showing sample contents of the inventory database from the POS system of FIG. 2;

FIG. 3B is a table showing sample contents of the merchant database from the remote processor system of FIG. 3A;

FIG. 3C is a table showing sample contents of the merchant order database from the remote processor system of FIG. 3A;

FIG. 4B is a table showing sample contents of the order database from the remote seller system of FIG. 4A;

FIG. 4C is a table showing sample contents of the retail store database from the remote seller system of FIG. 4A;

FIG. 4D is a table showing sample contents of the item database from the remote seller system of FIG. 4A;

FIG. 4E is a table showing sample contents of the customer database from the remote seller system of FIG. 4A;

Figure 6A:
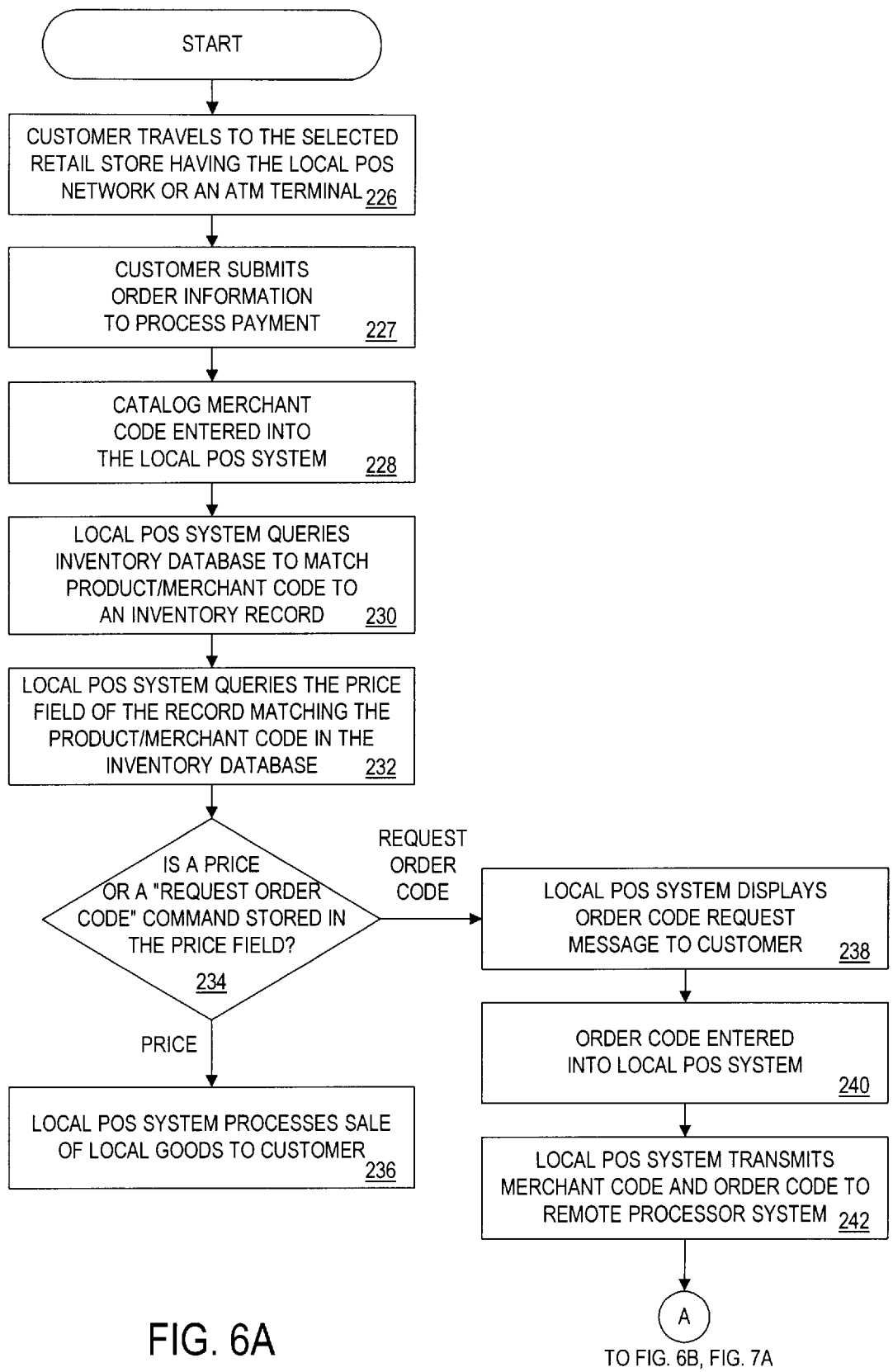
Figure 6B:
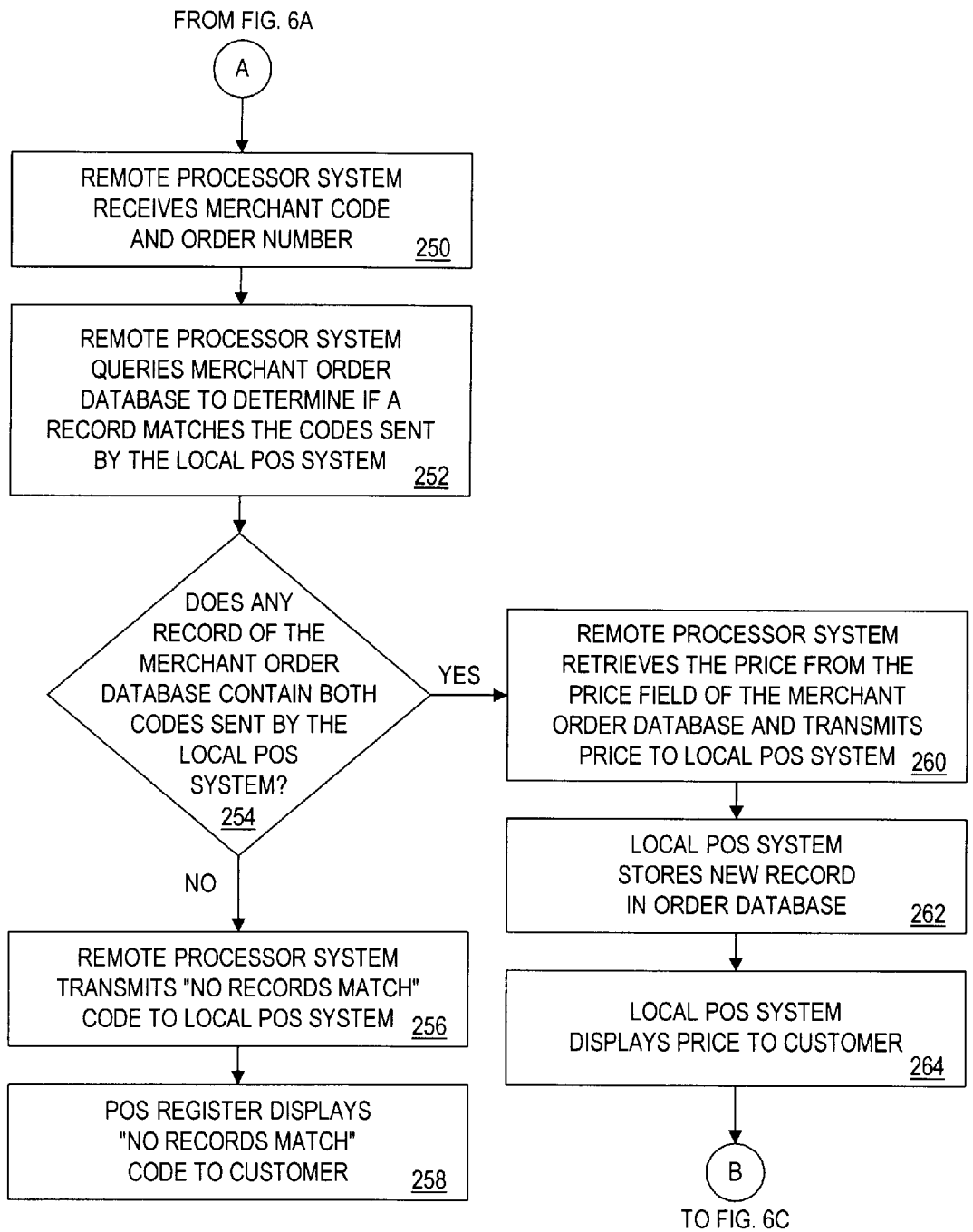
Figure 6C:
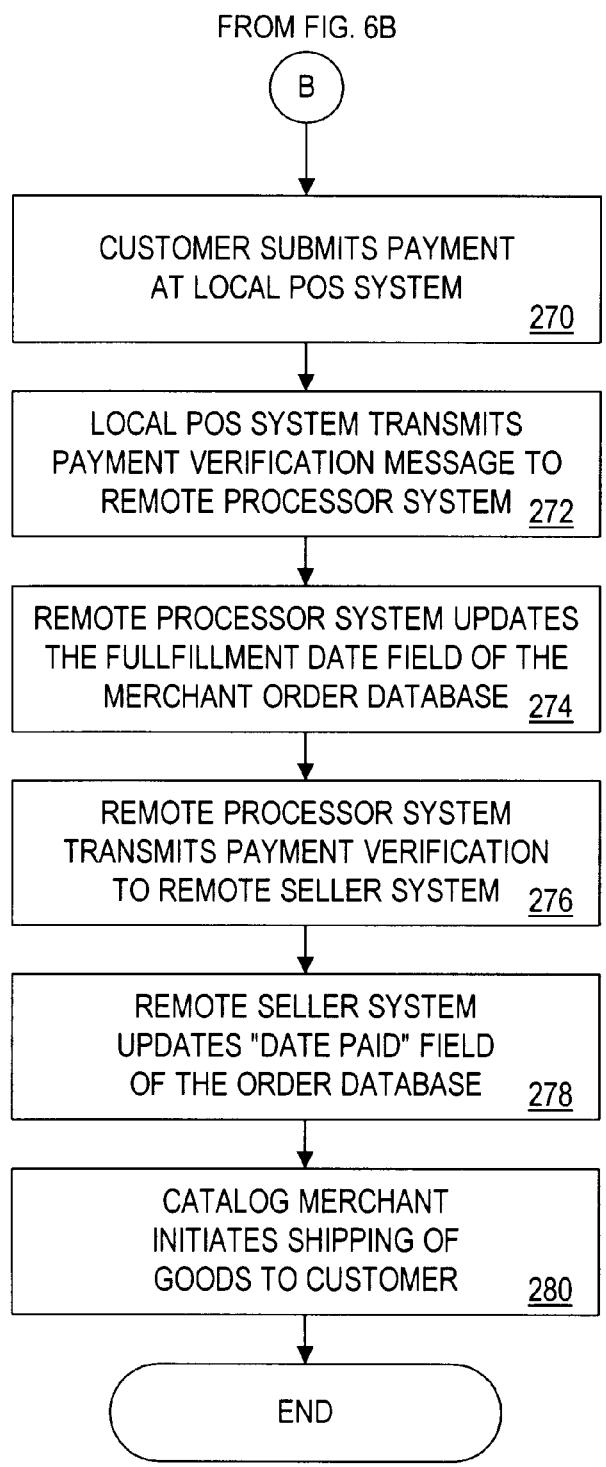
Figure 7A:
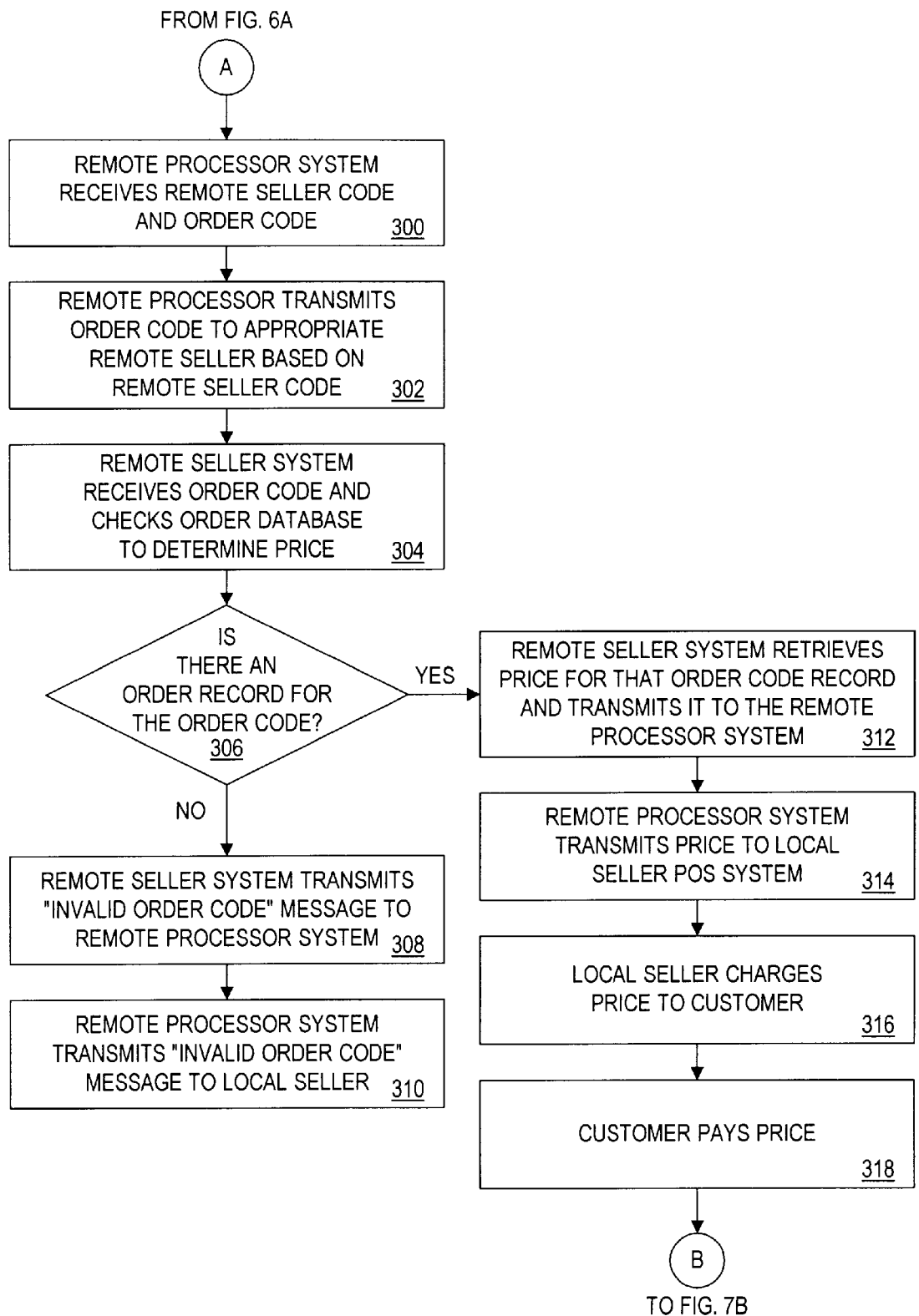
Figure 7B:
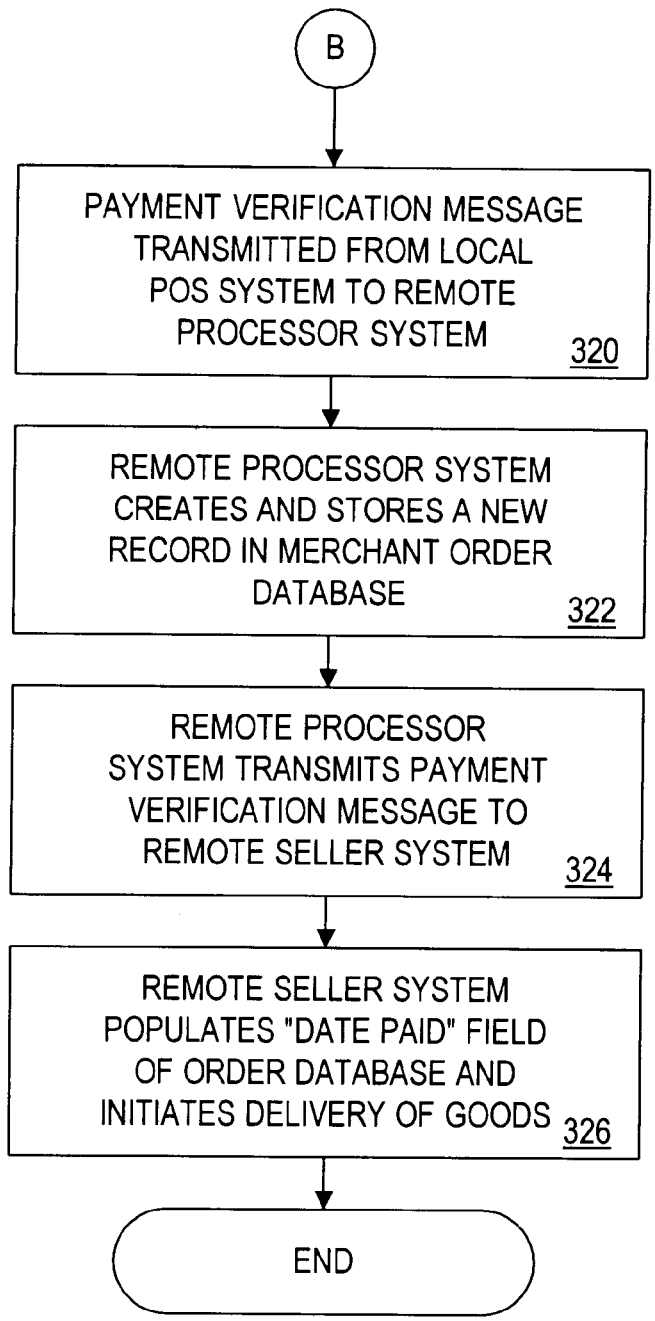

FIGS. 6A–C together comprise a flowchart showing a process by which the local POS system communicates with the remote processing computer system to process a payment for purchased goods; and FIGS. 7A–B together comprise a flowchart showing an alternate processor merchant process to that shown and described with respect to FIG. 6B.

DETAILED DESCRIPTION OF THE INVENTION

System Structure

System Overview

Figure 1:
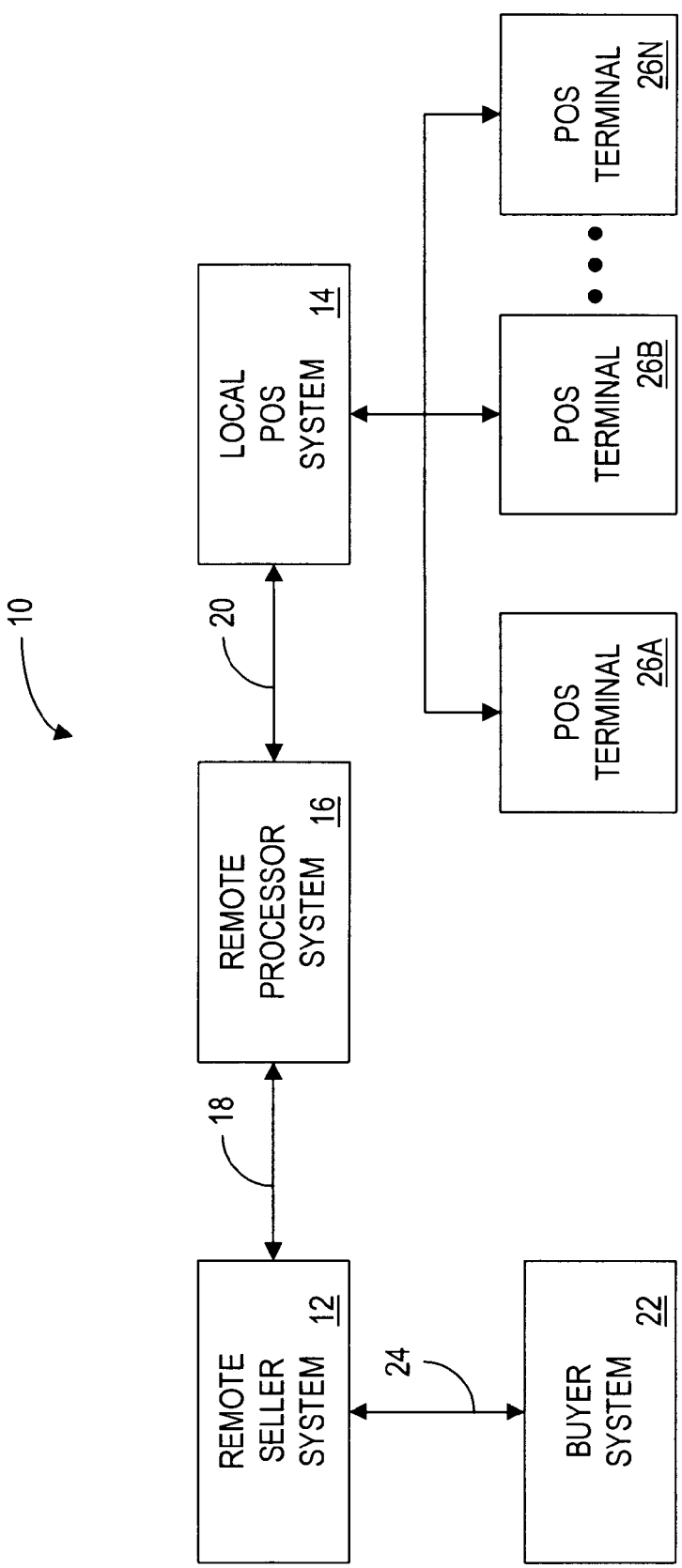
FIG. 1 is a block diagram of a payment processing system connected in accordance with the present invention.

Referring now to FIG. 1, a retail system 10 is shown including a remote seller system 12 connected to a local point-of-sale (POS) system 14 through a remote processor system 16. These systems are suitably interconnected by data links 18, 20, comprising for example telephone connections or electronic network connections. A buyer system 22 is connected to remote seller system 12 by a suitable data link 24. In the present embodiment data link 24 comprises an Internet connection, for example a conventional world-wide-web browser, established through a telephone line. A plurality of point-of-sale (POS) terminals 26A, 26B, 26n are connected to local POS system 14, for example through a conventional computer data network.

As will be explained in further detail below, remote seller system 12 comprises a remote retail transaction processing system, in the present embodiment a computerized order processing system operated by a remote seller herein described as a catalog marketer. Local POS system 14 with POS terminals 26A–n comprises a conventional, commercially available POS processing system. Remote processor system 16 comprises a conventional computer system connected and programmed to operate in accordance with the present invention, while buyer system 22 comprises a conventional home computer, again connected and programmed to implement the present invention.

As will be further described below, retail system 10 enables a customer operating buyer system 22 to make a remote purchase from remote seller system 12, and to subsequently pay for that remote purchase through a local retailer operating local POS system 14. Remote processor system 16 functions to facilitate the transaction by reconciling the payment made by the customer at local POS system 14 with the purchase made by the customer from remote seller system 12.

Local POS System

Figure 2A:
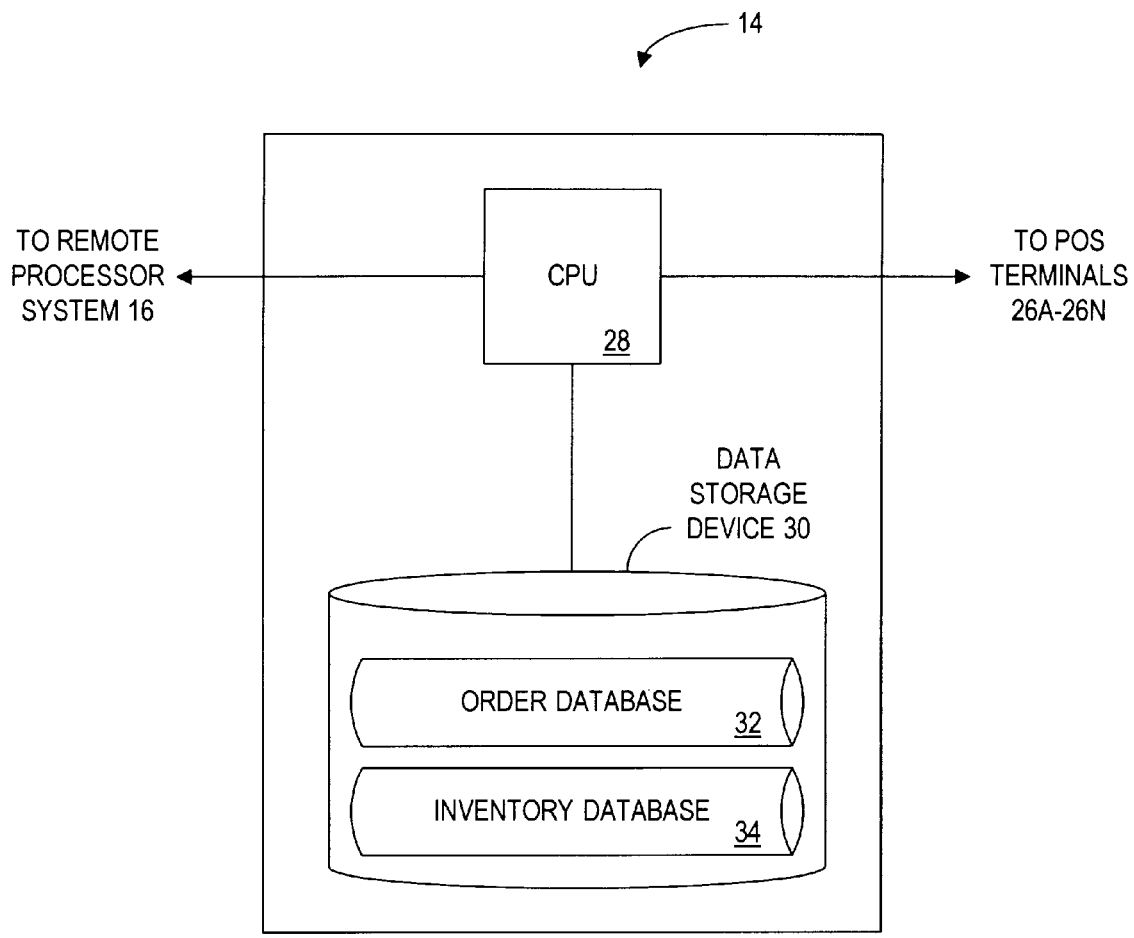
FIG. 2A is a block diagram of the local POS system of FIG. 1.

Referring now to FIG. 2A, local POS system 14 comprises a conventional POS processing system, for example of the type commercially available from NCR as the 7052 POS workstation, or the NCR System 3000 workstation with Regi$tore® software. Though such systems are well known in the art, for purposes of explanation the system is shown herein as including a central processing unit 28 connected to a data storage device 30. Data storage device 30 is shown to store two databases, an order database 32 and an inventory database 34, each described in further detail with respect to FIGS. 2B and 2C, respectively. Data storage device 30 further includes software instructions for controlling the operation of local POS system 14 in a manner described herein below.

Through conventionally known apparatus (not shown), local POS system 14 is connected to operate with POS terminals 26A–n and remote processor system 16.

In the present embodiment, local POS system 14 can comprise the point-of-sale processing system of any local retail establishment convenient to the customer. Alternatively, local POS system 14 can comprise an automatic teller machine (ATM) convenient to the customer. As used herein, the term "POS system" includes a conventional point-of-sale processing system, an ATM machine, and any other appropriate system for receiving and processing financial payments from customers. Further as used herein, the term "local" is used to describe a location operating a POS system and deemed convenient by the customer operator of buyer system 22 to visit for purposes of submitting a payment. In contrast, the term "remote" is used to describe a seller separate from the local POS system, in this embodiment the catalog merchant, and from which the customer makes a purchase without a physical visit to a premises. As will be appreciated, the invention has particular application where the remote seller is geographically distant from the customer and the customer's selected local POS system.

Referring now to FIG. 2B, order database 32 is seen to include a plurality of records 40, 42, 44, 46, each including four fields indicated at 48, 50, 52, 54. Fields 48 and 52 comprise, respectively, an order code and a price paid, or purchase price, for that particular order. As will be further described below, order code 48 and at least a portion of the corresponding price paid 52 are assigned by remote seller system 12 at the time of a sale to the buyer. A date paid field 54 is included to indicate the date on which a payment 52 for a particular order code 48 has been made. A catalog merchant code 50 is provided to identify a particular catalog merchant, and is typically established in local POS system 14 pursuant to a contractual agreement between the remote seller and the local seller operating POS system 14.

Referring now to FIG. 2C, inventory database 34 is seen to include a plurality of records 56, 58, 60, 62, 64, each having associated therewith three fields. A product/merchant code 66, input into local POS system 14 typically by scanning a barcode at a time of purchase/payment, identifies either a product code for a locally sold product (see records 56, 60), or a merchant identifier (see records 58, 62, and 64). A product/merchant name 68 results from processing product merchant code 66 and identifies either the name of a locally sold product (see records 56, 60), or a remote merchant (see records 58, 62, and 64). A price field 70 indicates either the price of the local goods (see records 56, 60), or an appropriate code indicating that further information, typically comprising an order code, must be requested from the customer to complete the transaction - indicated here as "REQUEST ORDER CODE" in records 58, 62, 64.

Thus with reference to FIG. 2C, one significant feature of the present invention is seen to include in local POS system 14 appropriate data for processing scanned barcodes (or other appropriately entered codes, such as typed in product SKU's) to identify both locally sold goods and remote sellers (catalog merchants in the illustrated embodiment). As will be seen from a discussion of the operation set out below, this feature of the invention confers the significant advantage of being able to process both the sale of local goods and remote catalog sales at a single POS register. Again as is further described below, the sale of local goods is processed in a conventional manner, while transactions identified as involving a remote seller are processed in a manner appropriate to the relationship with the remote seller.

Remote Processor System

Figure 3A:
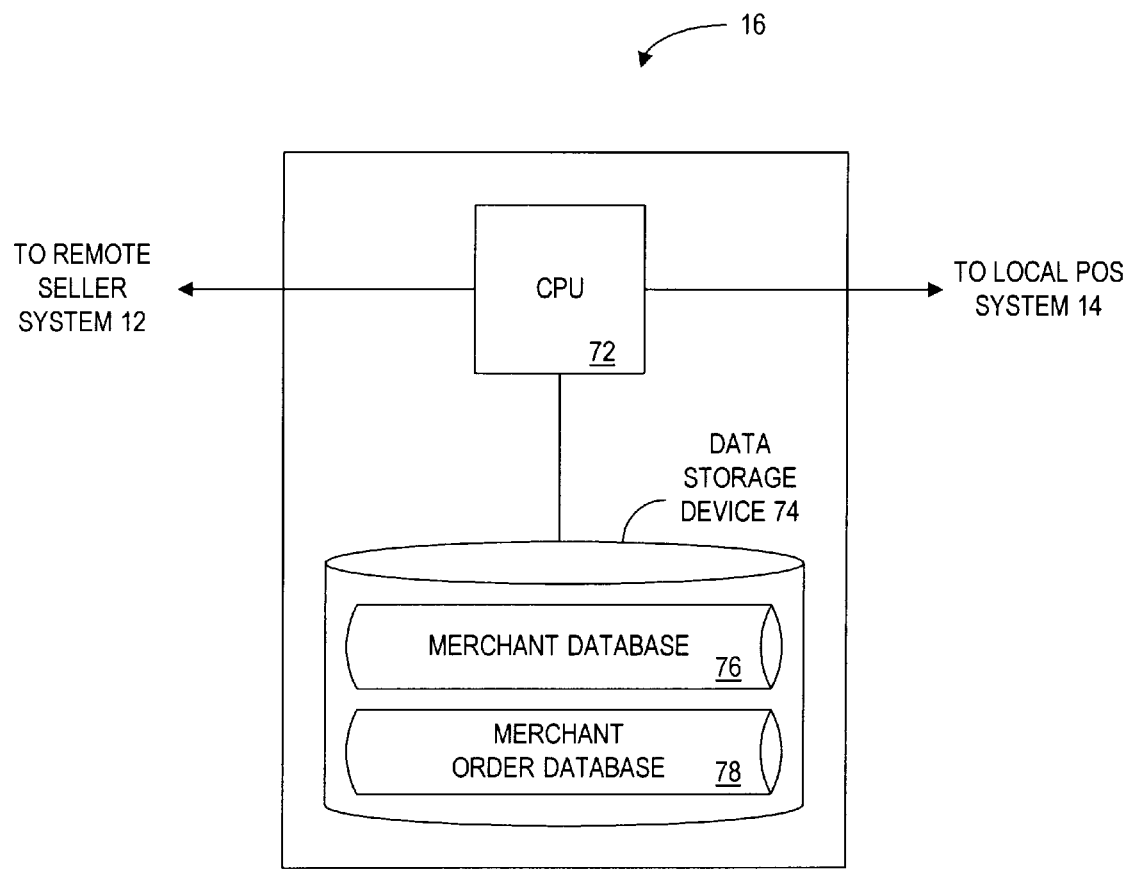
FIG. 3A is a block diagram of the remote processor system of FIG. 1.

Referring now to FIG. 3A, remote processor system 16 is seen to include a central processing unit (CPU) 72 connected to a data storage device 74. Data storage device 74 is shown to store two databases, a merchant database 76 and a merchant order database 78, each described in further detail with respect to FIGS. 3B and 3C, respectively. Data storage device 74 further includes software instructions for controlling the operation of remote processor system 16 in a manner described herein below.

Through conventionally known apparatus (not shown), remote processor system 16 is connected to operate with local POS system 14 and remote seller system 12.

Remote processor system 16 may comprise one of many conventionally known processing systems, such as an IBM-compatible personal computer running a Microsoft Windows® operating system. Likewise, data storage device 74 is a conventional data storage system, for example comprising an appropriate combination of a magnetic or optical disk storage medium and semiconductor memory including random access memory (RAM) and read-only memory (ROM). Alternatively, the function of remote processor system 16 and/or storage device 74 may be distributed across multiple systems in a conventional manner.

Referring now to FIG. 3B, merchant database 76 is seen to include four records 80, 82, 84, 86, each containing four fields: a catalog merchant code 88 containing data of like nature to field 50 of FIG. 2B, a merchant name 90, a merchant address 92, and a merchant phone number 94. The merchant name, address, and phone number are identifying information for each particular merchant.

Referring now to FIG. 3C, merchant order database 78 contains four records 96, 98, 100, 102, each including six fields: an order code 104 containing information of like nature with field 48 of FIG. 2B, a price field 106, a catalog merchant code 108 containing information of like nature to field 88 in FIG. 3A, a retailer merchant code 110, a posting date 112, and a fulfillment date 114. Price field 106 includes a price for a particular purchase order identified by order code 104. Retailer merchant code 1 10 identifies the retailer from whom a payment is received for a particular order, and is established between the retailer and the operator of remote processor system 16. Posting date 112 and fulfillment date 114 indicate the dates that particular order information has been received from a catalog merchant, and that data has been received from a retail merchant indicating receipt of payment, respectively.

In the present embodiment of the invention, the processor merchant operating remote processor system 16 is a credit card clearing house, for example First Data Corporation. It will be appreciated by those skilled in the art that established infrastructure exists for supporting data communications between credit card clearing houses and the POS systems of retail merchants.

In an alternate embodiment of the invention, the processing merchant can comprise the operator of a special purpose system established to practice applicant's invention. In yet another embodiment, remote processor system 16 (and its operator) may be omitted entirely, with remote seller system 12 communicating directly with local POS system 14.

Remote Seller System

Figure 4A:
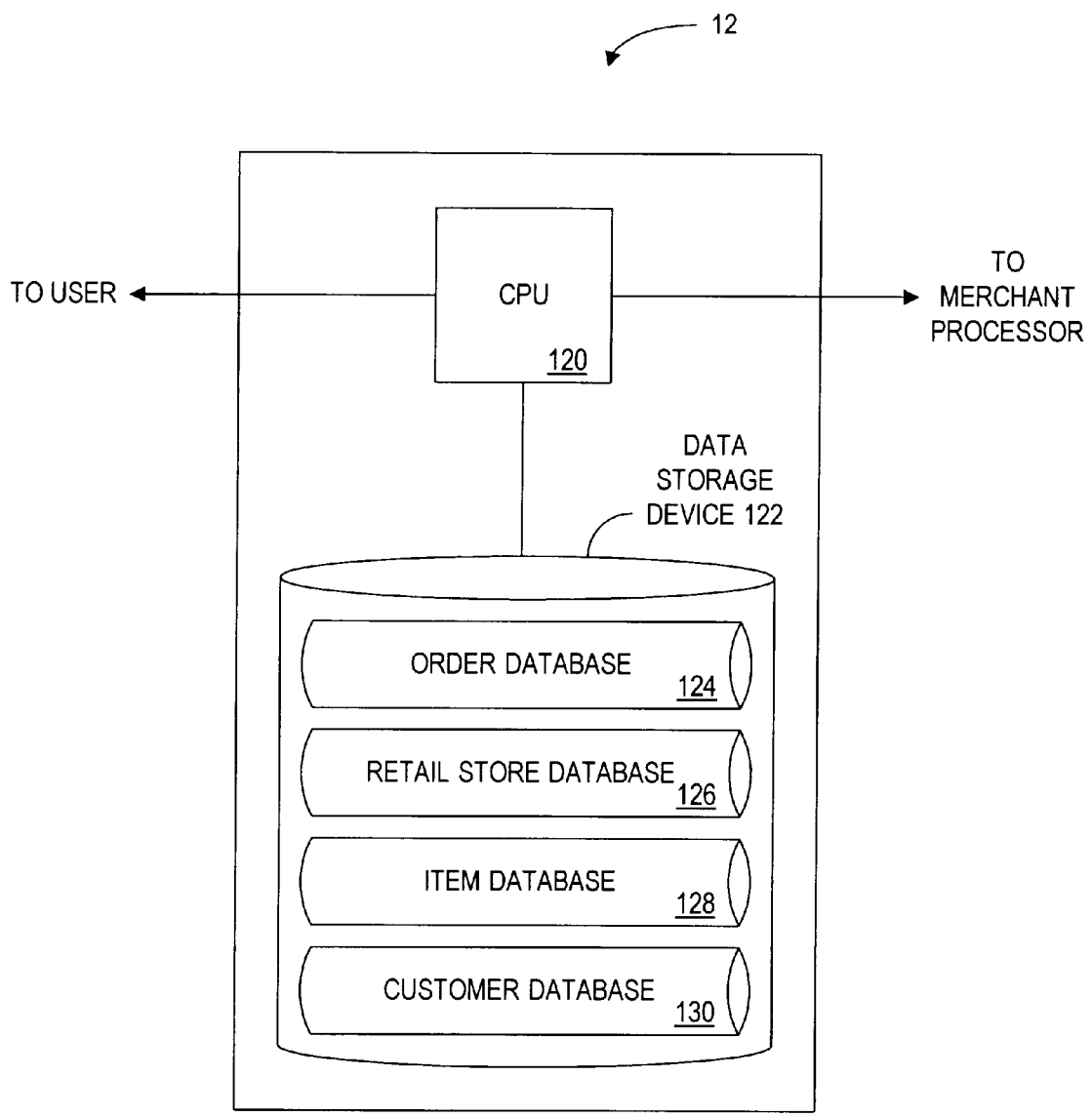
FIG. 4A is a block diagram of the remote seller system of FIG. 1.

Referring now to FIG. 4A, remote seller system 12 is shown to be substantially identical in structure to remote processor system 16 (FIG. 3A) described above. Briefly, remote seller system 12 is shown to include a central processing unit (CPU) 120 connected to a data storage device 122. Remote seller system 12 may comprise the same or functionally similar hardware and software to that described above with respect to remote processor system 16. In contrast to the earlier described system, data storage device 122 of remote seller system 12 includes four databases: an order database 124, a retail store database 126, an item database 128 and a customer database 130. As will be described in further detail below, these databases are established and operated to enable remote seller system 12 to track the sale of goods to customers, and the subsequent payment for those goods remitted through local POS system 14. Data storage device 122 further includes the software instructions for operating remote processing system 16 in accordance with the process described herein below.

With reference now to FIG. 4B, order database 124 is seen to include three records 132, 134, 136, each containing nine fields. These fields are shown herein populated with data exemplary of that employed by a catalog merchant. Examining these fields, an order code field 140 is provided containing data of like nature to similarly named fields 104 and 48, contained in order database 32 (FIG. 2B) and merchant order database 78 (FIG. 3C), respectively. A field 142 is provided to store a customer name. An order price field 144, date ordered code 146, and date paid code 148 contain data of like nature to price field 106, posting date 112, and fulfillment date 114 of merchant order database 78 (FIG. 3C). That is, the order price indicates the total price of a customer order, the date ordered indicates the date that the customer order was submitted (which may be identical to the posting date in the merchant order database), and the date paid date indicates the date that funds are paid to the local POS system operator by the customer (which is likely the same as the fulfillment date in the merchant order database).

Continuing now with the contents of order database 124, an items ordered field 150 includes a code or other descriptor of purchased goods comprising an order. A local POS operator field 152 identifies a retail store establishment that received and remitted a payment for an order. A delivery address field 154 contains an address to which goods associated with a purchase are delivered.

With reference now to FIG. 4C, retail store database 126 is seen to include three records 160, 162, 164, each including four fields: a retailer merchant code 166 of like nature with field 110 of merchant order database 78, and a retail store name 168, retail store address 170, and retail store telephone number 172. Each record of retail store database 126 thus identifies a specific retail store.

Referring now to FIG. 4D, item database 128 is indexed by an item number field 174 of like nature to field 150 of order database 124 (FIG. 4B). Item database 128 contains four records 176, 178, 180, 182, each of which contains five additional fields to item number field 174: a written descriptor field 184 describing a particular good, and size 186, color 188, price 190, and quantity in stock 192 fields containing additional information about each particular good.

Referring now to FIG. 4E, customer database 130 includes three records 174, 176, 178 each containing information relating to and identifying a particular customer. A customer identifier field 180 is provided, which may comprise a unique identification code provided by the catalog merchant specific to each customer or to each transaction. Associated with each customer identifier 180 are name, address, and phone number fields 182, 184, and 186, respectively, providing identifying information about the customer. A credit card number field 188 includes a credit card number or other payment information provided by a customer for payment purposes. The present invention being directed to better serving customers who choose not to pay the catalog merchant by credit card (at least not directly), credit card number field 188 is blank for such customers. See, for example, the customers identified in records 176 and 178. The field does, however, contain appropriate information for customers who do pay directly by credit card, such as the customer Bill Smith identified in record 174.

Operation

Establishing Preliminary Relationships and Data

In practicing the present invention, preliminary relationships are preferably established between the catalog merchant who operates remote seller system 12, the processing merchant who operates remote processor system 16, and the retail merchant who operates local POS system 14. More specifically, contractual relationships are established between the parties whereunder the retail merchant agrees to accept and forward customer payments to the catalog merchant in exchange for an agreed upon payment or other remuneration. Other contractual relationships are preferably established between the processing merchant and the other two parties, whereunder the processing merchant is compensated for processing the customer payment information in the manner described below.

At this time preliminary identification and record-keeping data is exchanged between the parties and entered into the appropriate database records and fields. Information established during this preliminary phase of operation may include: catalog merchant codes, various names, addresses, and telephone numbers, retailer merchant codes, and the like. Similarly, other operating data will have been entered into the databases of the various parties, including for example, customer information (where available), and product and pricing information.

Catalog Order Processing

Figure 5A:
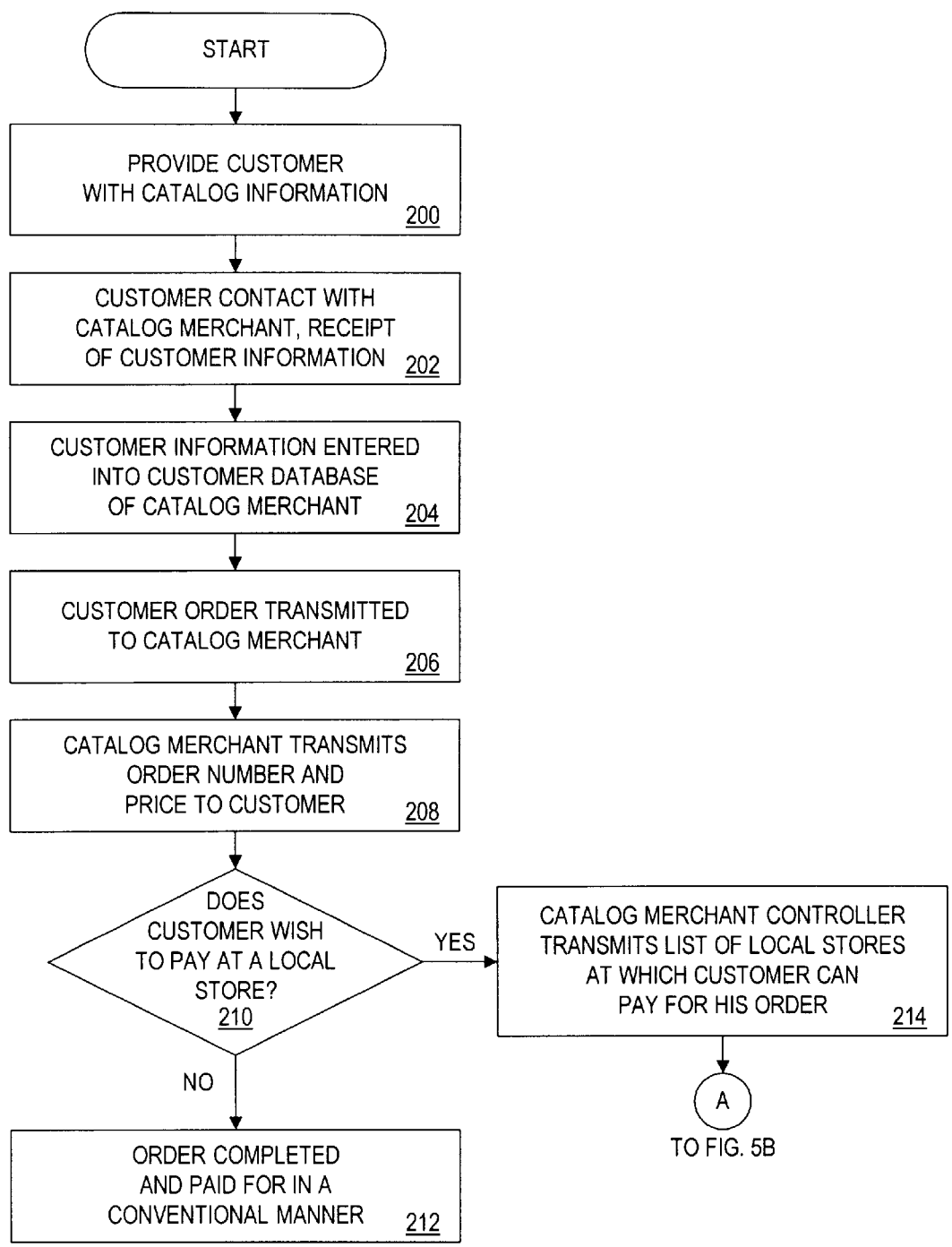
FIG. 5A is a flowchart showing a process by which a customer makes a purchase of goods using the system of FIG. 1.
Figure 5B:
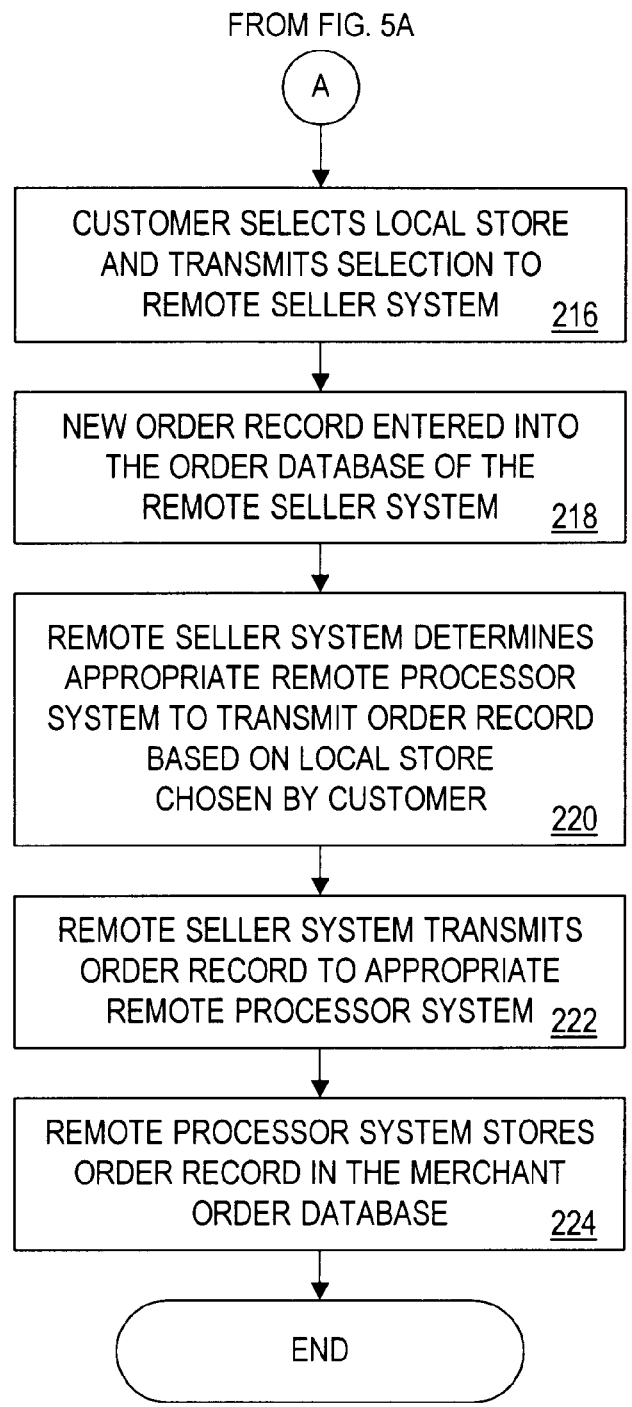
FIG. 5B is a flowchart showing a process by which the remote seller computer system transmits purchase data to the remote processing computer system.

Referring now to FIGS. 5A–*b*, a process is shown whereby a catalog merchant operates remote seller system 12 to receive a catalog order from a customer and process that order to facilitate payment at local POS system 14. The process described herein includes the function of remote processing system 16 as an intermediary between the remote seller and the local retailer. While this embodiment is the preferred embodiment, it will be understood that the function of remote processing system 16 is optional: the system may be omitted in its entirety and replaced by direct communications between remote seller system 12 and local POS system 14.

Referring first to FIG. 5A, the ordering process is initiated through the provision of catalog information by the catalog merchant to the customer (step 200). This step may be implemented through, for example, the provision of a paper catalog, or through the provision of on-line electronic catalog data, for example using the Internet. As used herein, the term "goods" includes all appropriate manner of products and services amenable to sale by the processes described herein.

In the first interaction with the customer, the customer contacts the catalog merchant and provides identifying information (step 202). Customer contact may include an electronic communication through, for example, the Internet, a telephone call to a live operator, or a telephone call to an interactive voice response unit (IVRU) operated by remote seller system 12. In the present embodiment, the customer contact with the catalog merchant will be described as through the operation of buyer system 22 over the Internet. During this contact, the customer supplies identifying information, including for example name, address and telephone number. Preliminary analysis may indicate the customer is already registered or established with the catalog merchant. If not, the customer data is entered into appropriate fields in customer database 130 (FIG. 4E), and an appropriate customer identifier assigned (step 204).

Once communications are established between the catalog merchant and the customer, the customer order is taken by the merchant (step 206). In the present embodiment, this is accomplished through the receipt of a conventional electronic order form. Many other conventional systems are known for order taking, including telephone and paper systems. In response to the receipt of the order, the catalog merchant generates a purchase number (also known as an order or confirmation number) and a purchase price and transmits both to the customer (step 208).

The customer is queried to determine if he would like to pay for the order at a local retail store (step 210). This query may be in the form of a question on the electronic order form. If the answer is no, a payment is collected in a conventional manner (step 212), for example by electronic or telephonic receipt of a credit card number with payment authorization.

If the customer indicates a preference to pay for the purchase at a local retail store, a list of available stores is provided for his selection (step 214). These stores are selected from amongst those with which relationships have been established, as described above, and again may be provided on the electronic order form. The list of available stores is preferably tailored to the geographic convenience of the customer, which may be determined automatically through the electronic ordering process in a well known manner.

Continuing with reference to FIG. 5B, the customer selection of a local retail store is transmitted to the catalog merchant's remote seller system by the customer's buyer system (step 216), and an order record is entered into order database 124 (FIG. 4B) of the catalog merchant system (step 218). Customer information is copied from or connected by computer-based data links to customer database 130, and the remaining order information is entered into the order database 124 (FIG. 4B).

To facilitate the customer payment to be made at a local retail store, the catalog merchant selects an appropriate processing merchant (step 220), and transmits the order record information to the remote processing system of same (step 222). This order data is used to populate the appropriate fields of merchant order database 78 (FIG. 3C) (step 224) for subsequent use by the processor merchant. The customer may select to print the Internet page (s) identifying and describing the remote seller and the purchased goods for subsequent use at the local store, particularly if these pages include barcodes that can desirably be used in the process below. At this point, the order process is complete.

It will be understood that there will likely be multiple processor merchants servicing different remote sellers and different local retail stores. Processor merchants may be established, for example, based on geography, or based on established contractual relationships with remote sellers and/or local retail stores. Where multiple processor merchants exist, the remote seller will select the appropriate one for transacting with in accordance with the local store selected by the customer for remittance of payment. Alternatively, the remote seller may provide the customer with a list of all local sellers from which the customer may select at the time of payment. Such a list will include local sellers pre-established with the catalog seller and processor merchant to receive such payments.

Local Retail Store Payment Process

Referring now to FIG. 6A, a process is shown whereby the customer travels to the selected local retail store to submit the payment for the order through the local POS system 14 (step 226).

Upon arrival at the store, the customer may choose to visit a register to pay the catalog charge, or to first shop for locally provided goods: i.e. those goods available at the store. At an appropriate time, the customer approaches a register of the local POS system and submits any locally selected goods along with order information on the catalog purchase, to initiate payment (step 227). In the described embodiment, the customer submits either the catalog itself or the printed Internet page(s) to initiate the payment process. The barcode, typically printed on or within the catalog or on the Internet page(s), is scanned into the register just as the barcodes on associated local goods are scanned (step 228), each catalog barcode thus providing a corresponding merchant code. In alternate embodiments, the customer may submit a code provided by the catalog merchant, or even just the name of the catalog merchant so that the register operator can select and enter an appropriate code.

Upon entry of the catalog merchant barcode into the local POS system, the barcode is used with product/field code 66 of inventory database 34 to determine the appropriate record to be processed. After a record is identified, the corresponding price field 70 is examined to determine if the barcode is representative of local goods or a remote seller (steps 232, 234). If the price field indicates a price, i.e. a local good as is the case with records 56 and 60, the price is added to the purchase in a conventional manner (step 236). If the price field returns a "request order code" or similar instruction, then the register operator is informed that the transaction involves a remote seller and further catalog order information is requested.

In the described embodiment, the register operator is prompted to request an order code from the customer (step 238). As described above, this order code has been provided to the customer from the catalog merchant, and is communicated to the register operator verbally or in paper format (i.e. written or printed barcode format). The order code is entered by the operator into the local POS system (step 240) and both the catalog merchant code and the order code are transmitted to the remote processor system of the processor merchant. In an alternative embodiment, the order price can be encoded into the order code provided by the remote seller, and decoded at the local point-of-sale system by the point-of-sale processor. Such methods for encoding and decoding information are well known in the art.

Processor Merchant Clearing Process

With reference now to FIG. 6B, the remote processor system of the processor merchant receives the catalog merchant code and the order code (step 250) transmitted by the local POS system. Merchant order database 78 (FIG. 3C) is interrogated to determine if the received catalog merchant code and the order code match the contents of any single record, that is if the received codes match the contents of retailer merchant code 110 and order code 104 for any of records 96–102 (steps 254, 256).

If the remote processing system has no record of the transaction, a "no records match" or similar message is transmitted back to the local POS system (step 256) for communication to the customer (step 258).

If a record is found that matches the received data, then the remote processing system transmits the price from field 106 of the appropriate record of merchant order database 78 back to the local POS system (step 260). A new record with the order information, i.e. order code, catalog merchant code, price paid, and date paid, is entered into order database 32 (step 262). The price is then displayed to the customer for payment (step 264).

Alternate Processor Merchant Clearing Process

With reference now to FIGS. 7A and 7B, there is disclosed an alternate embodiment of the processor merchant clearing process described above. More specifically, in this embodiment, the remote seller system does not provide the remote sales record to the remote processor system until after it has been requested by the remote processor system.

Examining now FIG. 7A, the remote processor system receives the merchant code and order code from the local POS system (step 300). In contrast to the method described above, in this embodiment the remote processor system does not maintain any records identifying potential transactions. Instead, upon receipt of the information from the local POS system, the remote processor system identifies a remote seller based on the received merchant code, and transmits the order code to that seller's remote seller system (step 302). The remote seller system receives the order code (step 304) and interrogates order database 124 (FIG. 4B) to determine if a record exists including the received order code and a corresponding order price (step 306).

If no order record is identified including the received order code, then the remote seller system transmits an "invalid order code" or similar message to the remote processor system (step 308), who in turn transmits a similar message to the local seller system (step 310). The local seller may then, for example, request from the customer another order number, or void the transaction.

If an order record is identified including the received order code, then the order price is retrieved from field 144 of order database 124 and transmitted to the remote processor system (step 312). The remote processor system transmits the order charge to the local seller POS system (step 314), where it is in turn used to bill the customer (steps 316, 318).

With reference now to FIG. 7B, upon receipt of payment from the buyer, the local POS system generates and transmits a payment verification message to the remote processor system (step 320), who in turn receives the message and creates and stores a new record in merchant order database 78 (FIG. 3C) (step 322).

The remote processor system transmits a payment verification message to the remote seller system (step 324), who then populates the date paid field 148 of order database 124 (FIG. 4B) with the receipt date of the payment verification (step 326). The remote seller system then initiates delivery of the goods to the buyer.

Processing the Customer Payment

With reference now to FIG. 6C, the customer submits a payment to the register operator of the local POS system (step 270). In accordance with a feature and advantage of the present invention, the options for such payment are as flexible as those typically available at a local retail merchant. That is, the customer may submit cash, a check, a credit card or other payment account indicator, a payment towards a layaway account, or any payment type acceptable to the local store.

Upon receipt of the payment, the register is appropriately operated and the local POS system is programmed to automatically transmit verification of the payment to the remote processing system of the processor merchant (step 272). The remote processor system enters the date of receipt of the verification into the fulfillment date field 114 of merchant order database 78 (step 274), whereby to indicate receipt of the payment verification. The remote processor system then transmits a verification of payment to the catalog merchant's remote seller system (step 276), initiating fulfillment of the order by the catalog merchant. In the present embodiment, the remote seller system updates date paid field 148 of order database 124 (step 278), automatically initiating a fulfillment process culminating in shipping of the goods to the customer (step 280). Many acceptable automated fulfillment processes and systems are known in the art.

Reconciling Accounts

Periodically, for example at the end of a monthly billing cycle, the processor merchant, the local retail merchants, and the catalog merchants reconcile their various accounts and transactions and settle financial payment obligations in accordance with the prearranged contracts described above. Moneys owed by the retail merchant to the catalog merchant may be paid according to any agreed schedule and in any appropriate manner, including direct payments such as a check or electronic funds transfer, and indirect payments through an appropriate third party, such as a credit card processor or the processor merchant. As used herein, statements that payments are received by a remote seller from the local POS system operator are intended to include all appropriate payment methods, including direct and indirect payment methods.

Summary

There has thus been described a new and improved system and method which enables customers to pay for remote purchases from third parties at local establishments. The invention provides the flexibility of payment options available at a local store with the convenience and vast selection of catalog or remote purchasing. While the invention has been described with respect to paying for catalog orders at local retail stores, it will be obvious that it has much broader application, being useful wherever it is convenient or desirable for a customer to make a local payment for a remote purchase.

While the present invention has been described with respect to specific embodiments, those skilled in the art will recognize that it has broad application, and is not thus limited.

What is claimed is:

1. A method of processing a payment for a purchase of goods, comprising the steps of:
   receiving at a point-of-sale system a code relating to a purchase of goods;
   determining if said code relates to a local order or to a remote order from a remote seller;
   if said code relates to a remote order, then
      determining a price for said remote order,
      generating data to indicate a payment has been received by a third party for said remote order, and
      transmitting said data to said remote seller.

2. A method in accordance with claim 1 wherein said step of determining a price for said remote order includes receiving said price from said remote seller.

3. A method according to claim 1, wherein said code identifies said remote seller.

4. A method according to claim 1, wherein said code identifies said remote order.

5. A method according to claim 4, wherein said code encodes said price.

6. A method according to claim 1, wherein said code encodes said price.

7. A method according to claim 6, wherein the step of determining said price comprises decoding said code.

8. A method of processing a payment for a purchase of goods, comprising the steps of:
   receiving at a point-of-sale system a code relating to a purchase of goods;
   determining if said code relates to a local order or to a remote order from a remote seller;
   if said code relates to a remote order, then
      determining a price for said remote order,
      receiving a payment for said remote order, and
      transmitting to said remote seller data indicating that said payment has been received for said remote order.

9. A method in accordance with claim 8 wherein said step of determining said price comprises requesting said price from a remote party.

10. A method in accordance with claim 9 wherein said step of requesting said price from a remote party includes requesting said price directly from said remote seller.

11. A method in accordance with claim 9 wherein the remote party receives said price from said remote seller.

12. A method in accordance with claim 8 wherein said step of determining said price comprises the step of deriving said price from said code.

13. A method in accordance with claim 8 wherein said step of determining if said code relates to a local order or to a remote order comprises the steps of:
   storing a plurality of product codes indicating local goods;
   storing a plurality of merchant codes indicating remote goods; and
   comparing said code with at least one of said plurality of product codes and said plurality of merchant codes.

14. A method in accordance with claim 8 wherein said code comprises a barcode, and said step of receiving said code comprises scanning said barcode.

15. A method in accordance with claim 14 wherein said barcode identifies said remote seller, and further including the step of requesting an order code including further information relevant to said purchase.

16. A method in accordance with claim 8 wherein said step of transmitting to said remote seller data indicating that said payment has been received for said remote order comprises transmitting said data directly to said remote seller.

17. A method in accordance with claim 8 wherein said step of transmitting to said remote seller data indicating that said payment has been received for said remote order comprises transmitting said data to a third-party intermediary for transmission to said remote seller.

18. A method in accordance with claim 17 and further including the step of selecting said third-party intermediary from a plurality of third-party intermediaries.

19. A method in accordance with claim 8 and further including the steps of:
   requesting an order code; and
   transmitting said order code to said remote seller with said data indicating that said payment has been received.

20. A method according to claim 8, wherein said code identifies said remote seller.

21. A method according to claim 8, wherein said code identifies said remote order.

22. A method according to claim 21, wherein said code encodes said price.

23. A method according to claim 8, wherein said code encodes said price.

24. A method according to claim 23, wherein the step of determining said price comprises decoding said code.

25. A method for a remote seller to process a payment for the sale of goods, comprising the steps of:
- receiving a remote order for a purchase of goods from a customer;
- generating a code and a purchase price for said remote order;
- transmitting said code and said purchase price to the customer;
- providing order data for use by a point-of-sale system of a local seller in receiving a payment for said remote order;
- receiving payment data confirming said payment has been received at said point-of-sale system of said local seller;
- initiating, responsive to said payment data, a shipment of said goods; and
- receiving a payment for said remote order from said local seller.

26. A method in accordance with claim 25 wherein said local seller comprises a third-party retailer having a contractual relationship with said remote seller.

27. A method in accordance with claim 25 wherein said step of providing order data includes providing at least one of said code and said purchase price.

28. A method in accordance with claim 27 wherein said step of providing order data comprises providing said order data directly to said local seller.

29. A method in accordance with claim 27 wherein said step of providing order data comprises providing said order data to a third party for transmission to said local seller.

30. A method in accordance with claim 29 and further including the step of selecting said third party based on an identity of said point-of-sale system.

31. A method in accordance with claim 25 wherein said step of providing order data comprises providing said order data responsive to said step of receiving a remote order.

32. A method in accordance with claim 25 wherein said step of providing order data comprises the steps of:
- receiving a request for said order data for use by said point-of-sale system; and
- providing said order data responsive to said step of receiving a request for said order data.

33. A method in accordance with claim 32 wherein said step of receiving a request for said order data includes receiving said request from said point-of-sale system.

34. A method in accordance with claim 32 wherein said step of receiving a request for said order data includes receiving said request from said point-of-sale system through a third party.

35. A method in accordance with claim 25 wherein said step of receiving a remote order for the purchase of goods includes receiving said remote order by telephone.

36. A method in accordance with claim 25 wherein said step of receiving a remote order for the purchase of goods includes receiving said remote order through a computer data network.

37. A method according to claim 25, wherein said code identifies said remote seller.

38. A method according to claim 25, wherein said code identifies said remote order.

39. A method according to claim 38, wherein said code encodes said purchase price.

40. A method according to claim 25, wherein said code encodes said purchase price.

41. A method submitting a payment for a purchase of goods, comprising the steps of:
- transmitting an order for goods to a remote merchant;
- receiving a code and a purchase price for said order from said remote merchant;
- providing at least one of said code and said purchase price for use by a point-of-sale system of a local seller in processing a payment for said order;
- submitting said payment to said local seller at said point-of-sale system; and
- receiving said goods from said remote merchant.

42. A method in accordance with claim 41 wherein said step of transmitting said order for goods to said remote merchant includes transmitting said order by telephone.

43. A method in accordance with claim 41 wherein said step of transmitting said order for goods to said remote merchant includes transmitting said order through a computer data network.

44. Apparatus for processing a payment for a purchase of goods, comprising:
- a point-of-sale system including a processor and a memory connected to said processor;
- said memory storing instructions for controlling said processor; and
- said processor operative with the stored instructions to
  - receive a code relating to a purchase of goods;
  - determine if said code relates to a local order or to a remote order from a remote seller; and
  - if said code relates to a remote order, then
    - determine a price for said remote order,
    - generate data to indicate receipt by a third party of a payment for said remote order, and
    - transmit said data to said remote seller.

45. Apparatus in accordance with claim 44 wherein said processor is further operative to transmit a request for said price to a remote party.

46. Apparatus for processing a payment for a purchase of goods, comprising:
- a point-of-sale system including a processor and a memory connected to said processor;
- said memory storing instructions for controlling said processor; and
- said processor operative with the stored instructions to
  - receive a code relating to a purchase of goods;
  - determine if said code relates to a local order or to a remote order from a remote seller; and
  - if said code relates to a remote order, then
    - determine a price for said remote order,
    - receive an indication of payment of said price for said remote order, and
    - transmit to said remote seller data indicating that said payment has been received for said remote order.

47. Apparatus in accordance with claim 46 wherein said processor is further operative to transmit a request for said price to a remote party.

48. Apparatus in accordance with claim 47 wherein said request is transmitted directly to said remote seller.

49. Apparatus in accordance with claim 47 wherein said request is transmitted to a third-party who receives said price from said remote seller.

50. Apparatus in accordance with claim 46 wherein said processor is further operative to derive said price from said code.

51. Apparatus in accordance with claim 46 wherein:
said memory further contains a plurality of product codes indicating local goods and a plurality of merchant codes indicating a plurality of remote sellers; and
said processor is further operative to compare said code with at least one of said plurality of product codes and said plurality of merchant codes in order to determine if said code relates to a local order or to a remote order from a remote seller.

52. Apparatus in accordance with claim 46 wherein said code comprises a barcode, and said point-of-sale system further comprising a barcode scanner connected to said processor and operative to scan said barcode.

53. Apparatus in accordance with claim 52 wherein said barcode identifies said remote seller, said processor further operative to generate a request for an order code containing further information relevant to said purchase.

54. Apparatus in accordance with claim 46 wherein said processor is operative to transmit said data directly to said remote seller.

55. Apparatus in accordance with claim 46 wherein said processor is operative to transmit said data to a third-party intermediary for transmission to said remote seller.

56. Apparatus in accordance with claim 55 wherein said processor is operative to select said third-party intermediary from a plurality of third-party intermediaries.

57. Apparatus for use by a remote seller in processing a payment for a sale of goods, comprising:
a processor; and
a memory connected to said processor and storing instructions for controlling said processor,
said processor operative with the stored instructions to
receive purchase data relating to a remote order for a purchase of goods from a customer,
generate a code and a purchase price for said remote order,
transmit said code and said purchase price to the customer;
generate order data for use by a point-of-sale system of a local seller in receiving a payment for said order,
receive payment data confirming said payment has been paid at said point-of-sale system of said local seller,
generate delivery data to initiate, responsive to said payment data, the shipment of said goods to said customer, and
receive verification data indicating receipt of said purchase price from said local seller.

58. Apparatus in accordance with claim 57 wherein said local seller comprises a third party having a contractual relationship with said remote seller.

59. Apparatus in accordance with claim 57 wherein said order data includes at least one of said code and said purchase price.

60. Apparatus in accordance with claim 59 wherein said processor is operative to initiate the transmission of said order data to said local seller.

61. Apparatus in accordance with claim 59 wherein said processor is operative to initiate the transmission of said order data to a third party for transmission to said local seller.

62. Apparatus in accordance with claim 61 wherein:
said memory further contains information identifying a plurality of third parties and a plurality of point-of-sale systems; said processor further operative to
select said third party based on an identity of said point-of-sale system.

63. Apparatus in accordance with claim 59, wherein said processor is operative to output said order data responsive to said operation of receiving purchase data.

64. Apparatus in accordance with claim 59 wherein said processor is operative to:
receive a request for said order data; and
provide said order data responsive to said request.

65. Apparatus in accordance with claim 64 wherein said processor is operative to receive said request from said point-of-sale system.

66. Apparatus in accordance with claim 64 wherein said processor is operative to receive said request from said point-of-sale system through a third party.

67. Apparatus in accordance with claim 57 and further including means connected to said processor for receiving said purchase data by telephone.

68. Apparatus in accordance with claim 57 and further including means connected to said processor for receiving said purchase data through a computer data network.

69. Apparatus for processing a payment for a purchase of goods, comprising:
means for receiving at a point-of-sale system a code relating to a purchase of goods;
means for determining if said code relates to a local order or to a remote order from a remote seller;
means, if said code relates to a remote order, for determining a price for said remote order;
means, if said code relates to a remote order, for generating data to indicate a payment has been received by a third party for said remote order; and
means, if said code relates to a remote order, for transmitting said data to said remote seller.

70. Apparatus for processing a payment for a purchase of goods, comprising:
means for receiving at a point-of-sale system a code relating to a purchase of goods;
means for determining if said code relates to a local order or to a remote order from a remote seller;
means, if said code relates to a remote order, for determining a price for said remote order;
means, if said code relates to a remote order, for receiving a payment of said price for said remote order; and
means, if said code relates to a remote order, for transmitting to said remote seller data indicating that said payment has been received for said remote order.

71. Apparatus for processing a payment for the sale of goods, comprising:
means for receiving a remote order for a purchase of goods from a customer;
means for generating a code and a purchase price for said remote order;
means for transmitting said code and said purchase price to the customer;
means for providing order data for use by a point-of-sale system of a local seller in receiving a payment for said remote order;
means for receiving payment data confirming said payment has been received at said point-of-sale system of said local seller;
means for initiating, responsive to said payment data, a shipment of said goods; and
means for receiving a payment for said remote order from said local seller.

72. An article of manufacture comprising:

a computer-readable medium having computer-readable program code means stored thereon for controlling a computer to process a payment for a purchase of goods, said computer-readable program code means including:

program code for receiving at a point-of-sale system a code relating to a purchase of goods;

program code for determining if said code relates to a local order or to a remote order from a remote seller;

program code, if said code relates to a remote order, for determining a price for said remote order, receiving a payment for said remote order, and transmitting to said remote seller data indicating that said payment has been received for said remote order.

73. An article of manufacture comprising:

a computer-readable medium having computer-readable program code means stored thereon for controlling a computer to process a payment for a purchase of goods, said computer-readable program code means including:

program code for receiving a remote order for a purchase of goods from a customer;

program code for generating a code and a purchase price for said remote order;

program code for transmitting said code and said purchase price to the customer;

program code for providing data for use by a point-of-sale system of a local seller in receiving a payment for said remote order;

program code for receiving data confirming said payment has been received at said point-of-sale system of said local seller;

program code for initiating, responsive to said receiving data, a shipment of said goods; and program code for receiving a payment for said remote order from said local seller.

* * * * *